June 1, 1948. H. E. TAUTZ 2,442,444
BORING HEAD

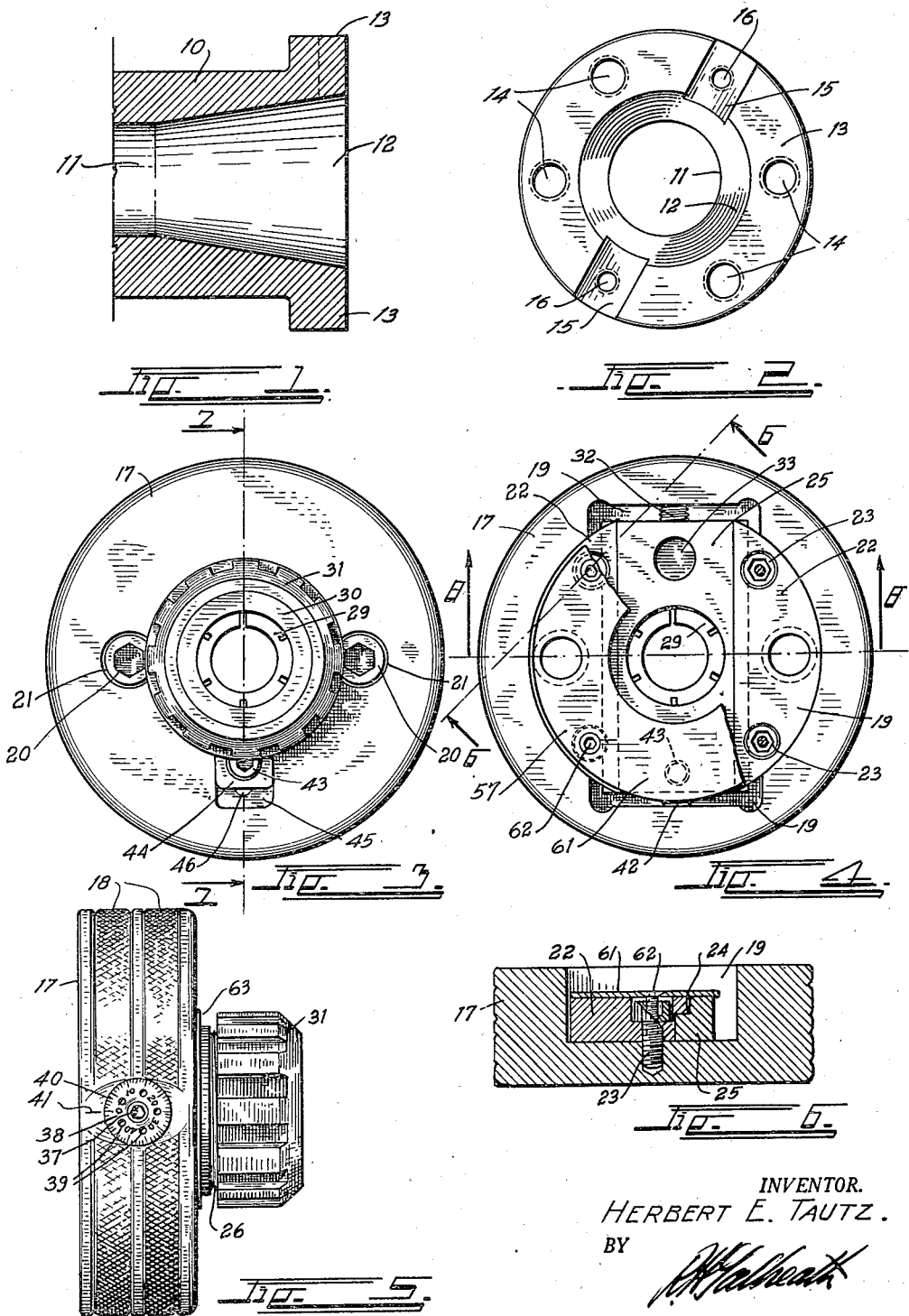

Filed Sept. 10, 1945 2 Sheets-Sheet 2

INVENTOR.
HERBERT E. TAUTZ.
BY
ATTORNEY.

Patented June 1, 1948

2,442,444

UNITED STATES PATENT OFFICE 2,442,444

BORING HEAD

Herbert E. Tautz, Englewood, Colo.

Application September 10, 1945, Serial No. 615,311

7 Claims. (Cl. 279—6)

This invention relates to a boring head for milling machines and boring mills. The principal object of the invention is to provide an exceedingly rigid, highly efficient and easily-operated boring head by means of which boring bars, drills, milling cutters, slotting tools, and other desired tools of any length may be rigidly and accurately held in place with any desired amount of projection of the tool from the head.

The usual boring head or chuck of the offset type is supported by means of a taper shank driven into the taper socket of the boring spindle of the boring machine. The head is placed on this taper shank. Due to the solid construction of the shank, it is impossible for the boring bar or tool to enter the shank. Therefore, the bar or tool must project from the chuck for substantially its entire length. This requires constant changing of boring bars of different lengths, or changing the position of the work on the table in order to place the cutting edge at the proper work position. For close work positions shorter bars must be used, and for more distant positions the short bars must be removed and replaced by longer bars or, if possible, the work must be removed.

In this improved boring head, a long bar can pass entirely through the head and into the hollow taper spindle of the boring mill for close work positions, or extended outwardly and locked in any desired position to accommodate the desired reach without the necessity of changing boring bars or moving the work piece.

Much time is expended by the operator of a milling machine or boring mill in placing the work in the proper position to suit the length or projection of the drill or other tool in the chuck. With this invention, however, the work can be placed close to the chuck, where great tool rigidity is obtained regardless of the length of the drill or other tool, since the tool can be slid into the chuck with only the minimum necessary projection therefrom, and for other parts of the work on the table the drill or other tool can be withdrawn to reach the desired part without constantly adjusting the table or moving the work thereon.

Other objects are to provide a milling boring head which can be quickly and easily applied to the standard boring and milling machines without requiring any changes in the latter, and to provide a head which will be exceedingly accurate and rigid in operation, and in which all chatter or lost motion will have been eliminated.

A still further object is to provide a telescoping boring bar for a head of this type in which a relatively small bar may be telescoped into a larger bar so as to reinforce the smaller bar for as much of its length as possible, with the given work, to reduce flexure and inaccurate cutting, and to provide telescopic reversible bars having large diameter cutters on one extremity, and small diameter cutters on the other extremity, which can be placed in the head with either extremity foremost.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a detail section through the extremity of a typical boring mill spindle of the type to which the improved head is designed for attachment;

Fig. 2 is a face view of the typical spindle of Fig. 1;

Fig. 3 is a front face view of the improved boring head, designed for attachment to the spindle of Fig. 1;

Fig. 4 is a rear face view of the improved boring head, with its cover plate partially broken away to illustrate the interior construction;

Fig. 5 is a top view thereof;

Fig. 6 is a detail sectional view taken on the line 6—6, Fig. 4;

Figure 7:
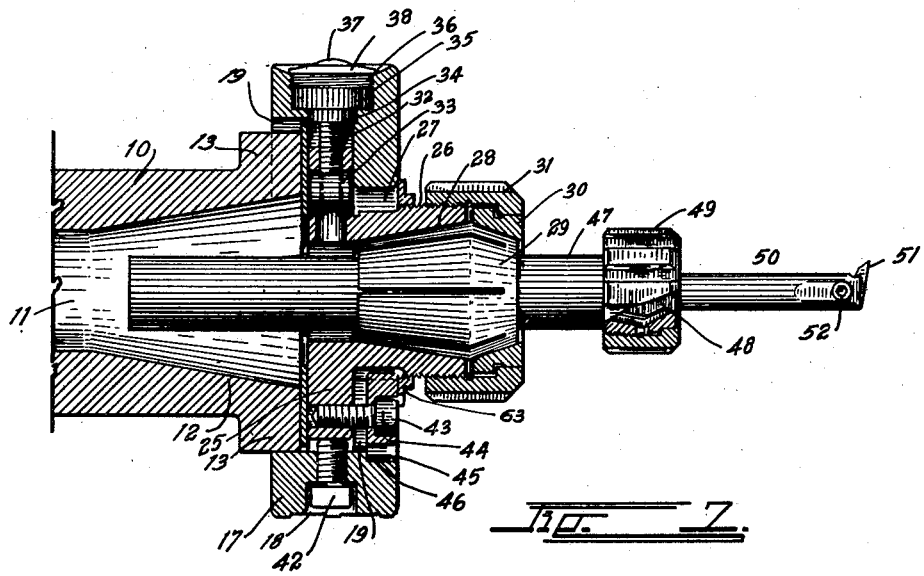
Fig. 7 is a longitudinal section through the boring head, illustrating it in place on the extremity of the typical spindle of Fig. 1, and as it would appear in use with one form of improved telescoping boring bar in place therein.
Figure 8:
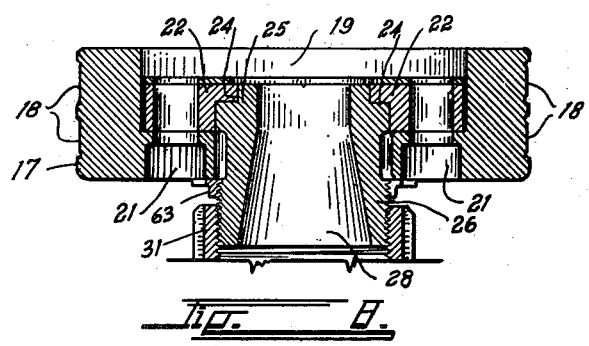
Fig. 8 is a horizontal section taken on the line 8—8, Fig. 4.

While the improved head is more particularly designed for attachment to a hollow, tapered, and flanged boring mill spindle, such as illustrated in Figs. 1, 2, and 7, it is, of course, not limited to this particular spindle but will be found valuable in many other installations.

The preferred spindle is designated by the numeral 10, and is provided with a longitudinally-extending axial bore 11 extending entirely therethrough. The outer extremity of the bore 10 terminates in a tapered chuck socket 12 to receive the usual drill or boring bar chuck. A peripheral flange 13 surrounds the outer extremity of the spindle. The flange 13 is provided with threaded attachment screw holes 14 and with key slots 15 and key screw holes 16 for the attachment of various tools, face plates, and the like.

The improved boring head employs a drum-like casing 17, preferably provided with knurled bands 18 on its exterior. The back of the casing 17 is hollowed out to form a cavity 19 of a diameter to accurately receive the flange 13 of the spindle 10, the cavity extending over half way through the thickness of the casing.

The improved head is attached to the face of the flange 13 of the spindle 10 by means of two attachment screws 20 which extend through shouldered counterbored openings 21 in the casing 17 and are threaded into any opposite two of the screw holes 14 in the spindle. When in place, the flange 13 of the spindle fits accurately into the cavity 19 in the casing to absorb all lateral thrust.

Two segment-shaped mortised slide blocks 22 are attached to the bottom of the cavity 19 in parallel relation at each side thereof by means of hollow head cap screws 23. The cap screws 23 are threaded into the casing 17 with their heads resting in counterbores in the blocks 22.

The straight sides of the blocks 22 are undercut to accurately overlap stepped edges 24 formed on the sides of a slidable collet base 25, so that the latter may move diametrically of the axis of the casing 17. The base 25 supports a collet sleeve 26 which projects forwardly through an elongated opening 27 in the front of the casing 17. The collet sleeve 26 is provided with the usual tapered axial socket 28 for receiving a conventional collet 29. The collet 29 is held in place in the socket 28 by means of a taper collar 30 which is clamped against the collet 29 by means of a collet nut 31 threaded onto the extremity of the collet socket sleeve 26.

Figures 10, 11:
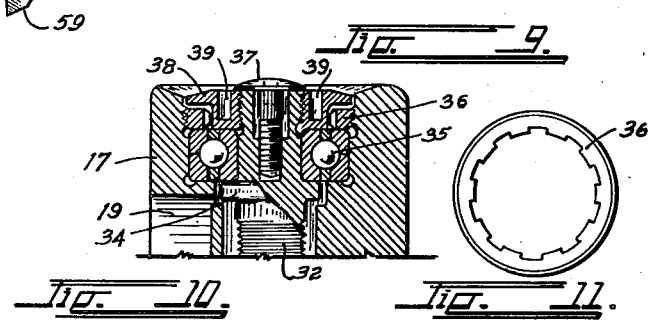
Fig. 10 is an enlarged detail section taken on the upper portion of line 7—7, Fig. 3, illustrating an offset control dial and bearing as used on the improved head.
Fig. 11 is a detail face view of a bearing retaining nut used in the bearing of Fig. 10.

The collet base 25 may be moved diametrically by means of a lead screw 32 which is threaded diametrically through a cylindrical, rotatable bronze nut 33 inset in the base 25. The screw 32 is formed with a thrust flange 34 which seats against the inner race of a ball thrust bearing 35, the outer race of which is held in a receiving socket in the casing 17 by means of an annular retaining nut 36, shown in detail in Fig. 11. An index nut 38 is threaded onto the extremity of the screw 32 against the opposite side of the inner race of the bearing 35 and is held in place thereon by means of a retaining screw 37 which is threaded into the extremity of the lead screw 32.

It can be readily seen that, as the index nut 38 is rotated in either direction, it will in turn rotate the screw 32, causing the latter to move the collet base 25 diametrically in either desired direction. The index nut 38 is provided with spaced wrench sockets 39 to facilitate its rotation by means of a suitable spanner wrench (not shown). The nut 38 carries a micrometric index scale 40, as shown in Fig. 5, the positions of which are indicated by an indexing marker 41 on the casing 17.

The scale 40 is preferably divided into fifty divisions, with twenty threads per inch on the lead screw 32 so that a movement of the scale one division will move the axis of the collet $1/1000$ of an inch toward or away from the axis of the casing 17. Thus any desired offset may be accurately obtained to one side of the axis of the casing 17. A stop screw 42 prevents movement to the other side of the axis. This screw is accurately machined so as to contact the base 25 at the point where the axis of the collet 29 coincides with the axis of the spindle 10. This enables the collet to be quickly and easily centered by simply rotating the nut 38 until contact is established with the stop screw 42.

The base 25 may be locked in any desired position by means of a locking screw 43 which passes through a clamping block 44 riding in a radially-extending block socket 45 in the face of the casing 17. The screw 43 passes through a slotted guide opening 46 in the bottom of the socket 45 and is threaded into the base 25. It can be seen that, if the screw 43 is tightened, it will act to clamp the block 44 against the bottom of its socket 45, preventing radial movement of the base 25.

The collet 29 can, of course, receive any desired tool, such as a drill, boring bar, milling head, slotter, etc. As illustrated in Fig. 7, it is supporting a telescoping boring bar consisting of a hollow outer bar 47 terminating at its outer extremity in a conventional collet 48 actuated by a collet nut 49. The collet 48 engages a smaller boring bar 50 which is slidable within the hollow interior of the outer boring bar 47, and which can be clamped at any desired degree of extension therefrom by means of the collet nut 49. The bar 50 terminates in any desired boring tool 51, clamped in place therein by means of a clamp screw 52.

For work close to the boring head, the bar 47 can be forced fully into the collet 29, since it can extend into the hollow interior of the spindle 10. The boring bar 50 can then be forced into the bar 47 to position the tool 51 at the desired point. For work at a greater distance from the boring head, the bar 47 is withdrawn as far as possible so as to limit the amount of extension of the smaller bar 50 as much as possible to prevent bending or chattering of the smaller bar. This allows deeper cuts to be made than could have been made with the smaller bar extending the full distance.

Figure 9:
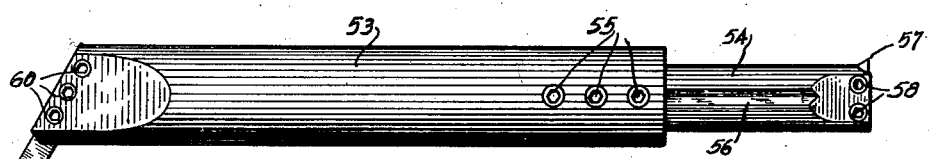
Fig. 9 is a detail side view of an alternate form of boring bar which may be used in the improved head.

In Fig. 9 an alternate form of telescoping boring bar is illustrated, comprising a hollow outer bar 53 in which an inner bar 54 is accurately and slidably mounted. The bar 54 can be locked at any desired projection by means of set screws 55, the points of which engage in a key groove 56 in the smaller bar to effectively prevent relative rotation between the two bars.

The smaller bar 54 terminates in a boring tool 57 held in place by set screws 58, and the larger bar terminates in a second boring tool 59 held in place by similar set screws 60. The boring bar is used in the head similarly to the previously described bar, that is, the larger bar 53 may be mounted in the collet 29 with either extremity projecting forwardly. The larger bar serves as a stiffener and reinforcement for the smaller bar 54 on long reaches.

The segment blocks 22 and the base 25, with its retaining screws 23, are covered by means of an annular cover plate 61 held in place by means of countersunk screws 62 threaded into the heads of the screws 23. The slotted opening 27 in the face of the casing 17 is concealed by means of a flanged cover ring 63 threaded onto the collet socket member 23 and attached to the block 44.

A drill or slotting tool can be used in the collet and for work which can be positioned close to the head, the drill or other tool can be slid through the head into the hollow spindle with only the necessary amount of projection so that flexure of the drill or tool is reduced to a minimum and extreme accuracy may be attained.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A head for boring machines of the type having a hollow boring spindle terminating in a flanged extremity with threaded attachment holes therein comprising: a cylindrical casing having a cavity in its rear face to receive the flanged extremity of the spindle; attachment screws extending through said casing from the front face thereof for threaded engagement with the attachment holes of the spindle; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening at the axis of said casing; a collet carried at the forward extremity of said collet sleeve; the hollow of said sleeve extending through said base in alignment with the hollow of the spindle; and means for moving said collet base along said segment blocks.

2. A head for boring machines of the type having a hollow boring spindle terminating in a flanged extremity with threaded attachment holes therein comprising: a cylindrical casing having a cavity in its rear face to receive the flanged extremity of the spindle; attachment screws extending through said casing from the front face thereof for threaded engagement with the attachment holes of the spindle; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening at the axis of said casing; a collet carried at the forward extremity of said collet sleeve, the hollow of said sleeve extending through said base in alignment with the hollow of the spindle; a nut imbedded in said collet base; a lead screw extending diametrically into said casing and being threaded into said nut; and a thrust bearing preventing longitudinal movement of said lead screw.

3. A head for boring machines of the type having a hollow boring spindle terminating in a flanged extremity comprising: a cylindrical casing having a cavity in its rear face to receive the flanged extremity of the spindle; means for attaching said casing to said flanged extremity; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening at the axis of said casing; a collet carried at the forward extremity of said collet sleeve, the hollow of said sleeve extending through said base in alignment with the hollow of the spindle; and means for moving said collet base along said segment blocks.

4. A head for boring machines of the type having a hollow boring spindle terminating in a flanged extremity with threaded attachment holes therein comprising: a cylindrical casing having a cavity in its rear face to receive the flanged extremity of the spindle; attachment screws extending through said casing from the front face thereof for threaded engagement with the attachment holes of the spindle; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening at the axis of said casing; a collet carried at the forward extremity of said collet sleeve, the hollow of said sleeve extending through said base in alignment with the hollow of the spindle; means for moving said collet base along said segment blocks; an annular cover plate fitted into said cavity over said collet base and guide blocks, said plate having an axial opening exceeding the diameter of the hollow in said collet sleeve; and means for securing said cover plate in place.

5. A head for boring machines of the type having a hollow boring spindle terminating in a flanged extremity with threaded attachment holes therein comprising: a cylindrical casing having a cavity in its rear face to receive the flanged extremity of the spindle; attachment screws extending through said casing from the front face thereof for threaded engagement with the attachment holes of the spindle; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening in the axis of said casing; a collet carried at the forward extremity of said collet sleeve, the hollow of said sleeve extending through said base in alignment with the hollow of the spindle; means for moving said collet base along said segment blocks; and attachment screws fitted into counterbores in said guide blocks and being threaded into said casing for securing the former to the latter.

6. A head for boring machines of the type having a hollow boring spindle terminating in a flanged extremity with threaded attachment holes therein comprising: a cylindrical casing having a cavity in its rear face to receive the flanged extremity of the spindle; attachment screws extending through said casing from the front face thereof for threaded engagement with the attachment holes of the spindle; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening at the axis of said casing; a collet carried at the forward extremity of said collet sleeve, the hollow of said sleeve extending through said base in alignment with the hollow of the spindle; means for moving said collet base along said segment blocks; attachment screws fitted into counterbores in said guide blocks and being threaded into said casing for securing the former to the latter; a cover plate fitted into said cavity over said collet base and said guide block, said cover plate having an axial opening exceeding the diameter of the hollow in said collet sleeve; and plate screws passing through said plate into threaded receiving sockets in said attachment screws.

7. A head for boring machines of the type having a hollow boring spindle terminating in a flanged extremity with threaded attachment holes therein comprising: a cylindrical casing having a cavity in its rear face to receive the flanged extremity of the spindle; attachment screws extending through said casing from the front face thereof for threaded engagement with the attachment holes of the spindle; an elongated collet base resting in said cavity; a segment-shaped slide block secured in said cavity at each side of said base, the inner edges of said blocks overlapping the outer edges of said collet base; a hollow collet sleeve projecting forwardly from said block through an elongated opening at the axis of said casing; a collet carried at the forward extremity of said collet sleeve, the hollow of said sleeve extending through said base in alignment with the hollow of the spindle; means for moving said collet base along said segment blocks; a clamping block resting in a radially extending guide socket in the front face of said housing, the axis of said socket lying parallel to the axis of said collet base; and a locking screw extending through said clamping block and being threaded into said collet base for clamping said block against the bottom of said socket, there being an elongated opening in the bottom of said socket allowing lateral movement of said locking screw.

HERBERT E. TAUTZ.

REFERENCES CITED

The following references are of record in the file of this patent:

UNITED STATES PATENTS

| Number | Name | Date |
|---|---|---|
| 85,329 | Reid | Dec. 29, 1868 |
| 981,062 | Casler | Jan. 10, 1911 |
| 1,125,649 | Carr | Jan. 19, 1915 |
| 1,256,462 | Frey et al. | Feb. 12, 1918 |
| 2,393,777 | Hughes et al. | Jan. 29, 1946 |

FOREIGN PATENTS

| Number | Country | Date |
|---|---|---|
| 142,194 | Great Britain | 1920 |